Dec. 10, 1940.　　　　　O. WERNER　　　　　2,224,755
ELECTRICAL TRANSFORMATION APPARATUS
Filed May 23, 1939　　　　2 Sheets-Sheet 1
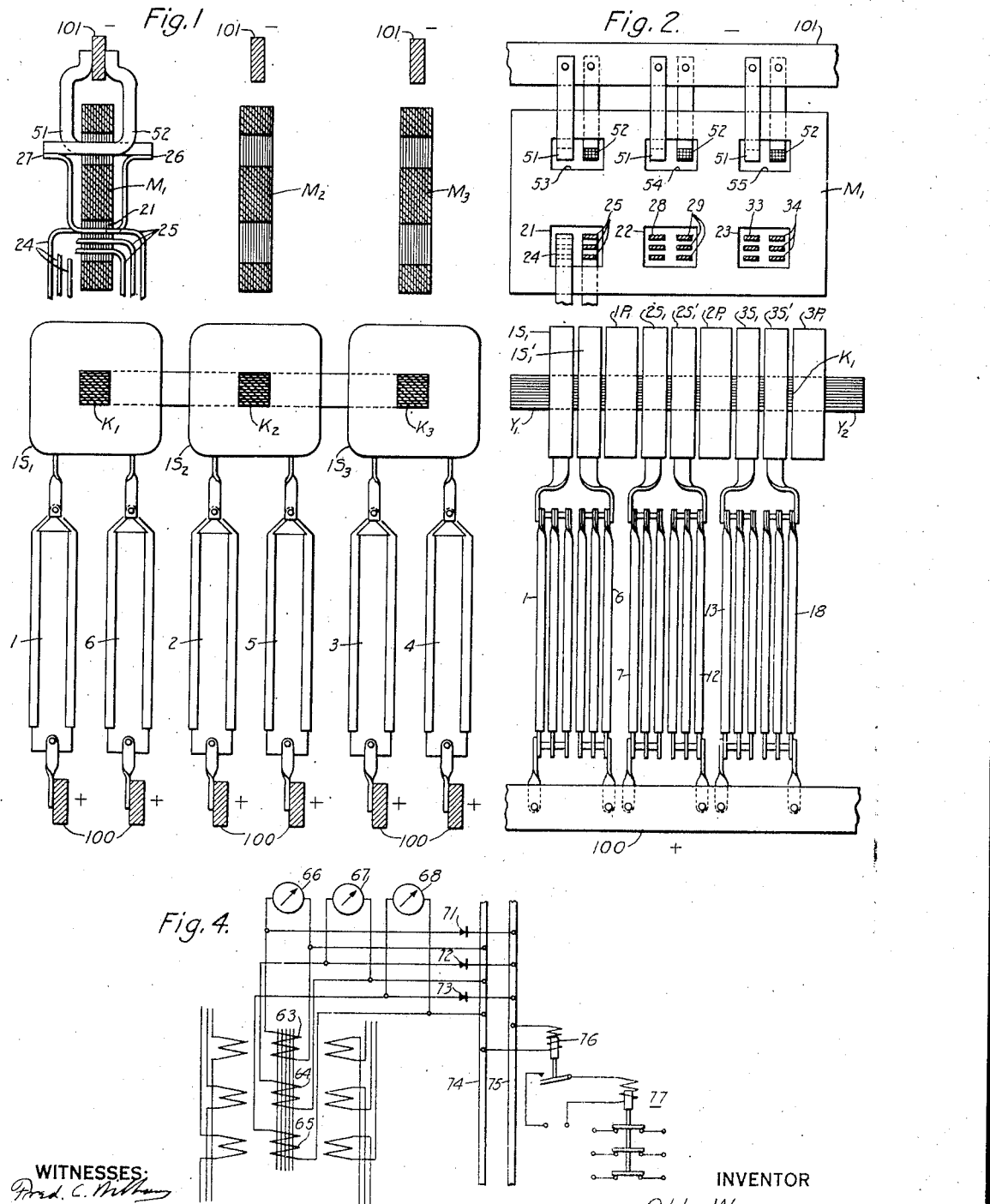

Dec. 10, 1940.   O. WERNER   2,224,755
ELECTRICAL TRANSFORMATION APPARATUS
Filed May 23, 1939   2 Sheets-Sheet 2

WITNESSES:

INVENTOR
Otto Werner
BY
ATTORNEY

Patented Dec. 10, 1940

2,224,755

UNITED STATES PATENT OFFICE 2,224,755

ELECTRICAL TRANSFORMATION APPARATUS

Otto Werner, Klein-Machnow, near Berlin, Germany, assignor to Westinghouse Electric & Manufacturing Company, East Pittsburgh, Pa., a corporation of Pennsylvania Application May 23, 1939, Serial No. 275,167
In Germany August 24, 1938

10 Claims. (Cl. 175—363)

The invention relates to apparatus for supplying direct current energy from an alternating current source, and may be employed in such industrial applications as electrolytic plating, direct current furnaces or welding devices where very large electric currents are desired.

The apparatus consists of a polyphase transformer, the secondary side of which supplies energy to dry type (copper oxide) rectifiers from which the direct current is delivered. In rectifiers of this type, the resistance values of the individual rectifier discs or disc groups vary during operation so that in a system in which a large number of such rectifiers operate in parallel, the current flow through the various rectifier units may differ widely, the rectifier units of higher resistance delivering smaller currents and the units of lower resistance delivering higher currents, resulting in the overloading of certain sections or groups of rectifiers, thus adversely affecting the operation of the apparatus.

In accordance with the invention, this undesirable characteristic is overcome or largely reduced by sub-dividing the transformer windings into a number of groups, each group of which feeds a separate rectifier group, and in providing individual circuits in parallel for supplying the several rectifier units. With this arrangement, load unbalance between the rectifier groups is prevented and no considerable overloading of the individual parts exists.

If the resistance of a particular rectifier group or unit increases, a smaller power output therefrom results. To overcome this limitation in the operation of the apparatus, current dividers or balancing reactors are provided for balancing the division of current between the individual rectifier circuits by establishing a transformer-like coupling between these circuits and supplying additional power into the circuits in which the power decreases as a consequence of an increase in the rectifier resistance.

It is also desirable, in many cases, to use additional balancing reactors or energy absorbing choke coils in circuits which use the alternating current half waves of both polarities, the windings of the chokes being connected to a neutral point conductor of the secondary windings in series with the current dividers or compensators from the individual phase windings to effect a balance in the distribution of power within the phase winding groups.

It may also be desirable to provide indicating devices for indicating high power decreases in a rectifier circuit or a relatively great unbalance in the rectifier units in the absorption chokes or to use the measure of such unbalance as a means for interrupting the circuit to the apparatus should the unbalance become excessive.

The invention will be better understood by reference to the accompanying drawings, in which Figure 1 is an elevational view, partly in section, through the essential parts of power transfer equipment organized in accordance with the invention;

Fig. 2 is a view in side elevation of the apparatus shown in Fig. 1, with parts shown in section;

Fig. 4 is a diagrammatic view of auxiliary indicating and protecting equipment which may be used with the apparatus shown in the other figures.

Figure 3:
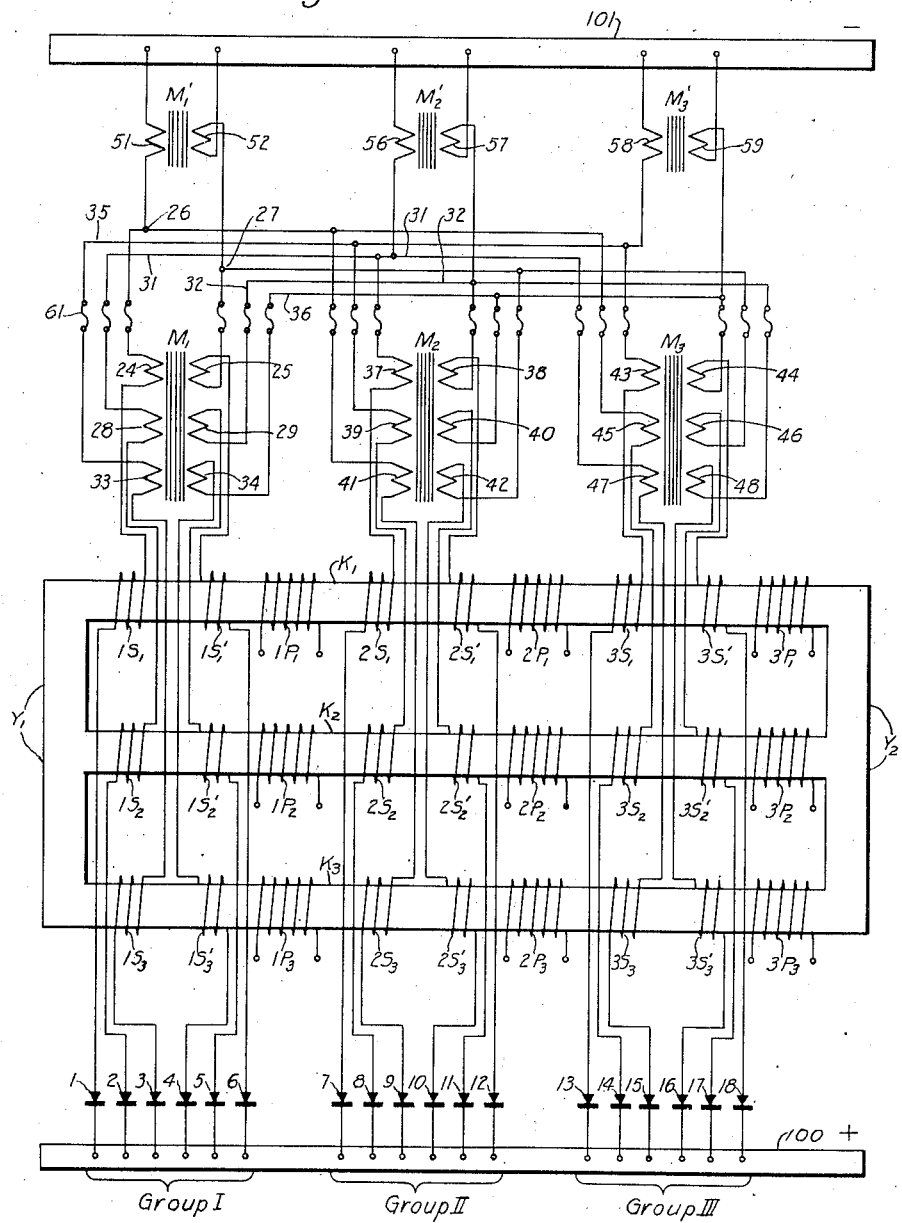
Fig. 3 is a diagrammatic view of the apparatus shown in Figs. 1 and 2 together with their connecting circuits.

Referring to Figs. 1, 2 and 3 of the drawings, a three-phase transformer core is shown having three winding legs $K_1$, $K_2$ and $K_3$ connected at the ends by yoke portions $Y_1$ and $Y_2$. Windings are provided on each of the three winding leg portions for suppyling three groups of rectifiers which may be positioned below the transformer and which are indicated at the bottom of Fig. 3 as groups I, II and III, respectively, and all of which are connected to supply current to the positive direct current terminal conductor 100 of the apparatus.

Referring particularly to Fig. 3, three primary windings are provided on each core leg, each of which is closely coupled with two secondary windings, thus providing six secondary windings, two on each of the three core legs, for supplying current to the six rectifiers of a group. For example, three primary windings $1P_1$, $2P_1$ and $3P_1$ are provided on the core winding leg $K_1$; three primary windings $1P_2$, $2P_2$ and $3P_2$ are provided on the second winding leg and $1P_3$, $2P_3$ and $3P_3$ are provided on the third winding leg $K_3$. The primary windings on one winding leg are connected to be supplied from the same phase of a three phase circuit. In the designation of the windings used, the prefix to the letter identifies the rectifier group with which the winding is associated and the suffix indicates the core leg of the transformer with which it is associated, the three primary windings $1P_1$, $1P_2$ and $1P_3$, for example, each being associated with rectifier group I and being positioned, respectively, on the three winding legs, $K_1$, $K_2$ and $K_3$. The secondary windings are similarly designated with respect to their associated rectifier groups and winding legs, the pair of windings $1S_1$ and $1S_1'$ being wound on the first transformer leg $K_1$ in opposite directions so as to develop voltages of opposite vector relation to their associated rectifiers 1 and 6, respectively, in the group I. Likewise, a pair of secondary windings $1S_2$ and $1S'_2$ are provided on the second core leg K for supplying opposite vector voltages to the rectifiers 2 and 5 of group I and a pair of secondary windings $1S_3$ and $1S'_3$ are provided on the third winding leg $K_3$ to supply voltages of opposite vector relation to the rectifier units 3 and 4 respectively, of rectifier group I. Similarly, a pair of secondary windings $2S_1$ and $2S'_1$ are provided on winding leg $K_1$ to supply opposite vector voltages rectifier units 7 and 12, respectively, a pair of secondary windings $2S_2$ and $2S'_2$ are provided on the core leg $K_2$ for supply rectifier units 8 and 11 and a pair of windings $2S_3$ and $2S'_3$ are provided on the third winding leg $K_3$ for supplying rectifier units 9 and 10. It will be noted that each pair of secondary windings, in which one is identified from the other by priming the identifying letter, supply currents of opposite vector polarity. In a similar manner, the six windings of three pairs each are arranged for supplying the six rectifiers 13, 14, 15, 16, 17 and 18 of group III, the pair $3S_1$ and $3S'_1$ being on the core leg $K_1$, the pair $3S_2$ and $3S'_2$ being on the secondary or leg $K_2$ and the pair $3S_3$ and $3S'_3$ being on the third core leg $K_3$. It will also be noted that in the construction shown each primary winding on any core leg is closely coupled to a pair of secondary windings supplying rectifier units in the associated rectifier group.

In Fig. 2, the three end windings $1S_1$, $1S_2$ and $1S_3$ at one end of the three core legs $K_1$, $K_2$ and $K_3$ are clearly shown connected through their respective rectifier units 1, 6, 2, 5 and 3 and 4 to the positive terminal of the apparatus shown in Fig. 1 as six separate bars 100, which, it will be understood are all connected together electrically to form a single terminal. In Fig. 2, the side view of the transformer coil and core structure discloses the position of the several secondary and primary windings on the core leg $K_1$, which corresponds to the position shown in Fig. 3, the pair of windings $1S_1$ and $1S'_1$ being connected to supply rectifier units 1 and 6 of the first rectifier group, the pair of secondary windings $2S_1$ and $2S'_1$ being connected to supply rectifier units 7 and 12, respectively, of the second rectifier group and the pair of windings $3S_1$ and $3S'_1$ being connected to supply rectifier units 13 and 18 of the third rectifier group, the output side of all such rectifiers being connected to the positive terminal conductor 100.

The terminals of each of the secondary windings of the transformer opposite to those connected to the rectifier units are connected to the negative bus terminal conductor 101 shown at the top of Figs. 1, 2 and 3 through circuits which include current dividers or balancing reactors $M_1$, $M_2$ and $M_3$ and energy absorbing choke coils $M'_1$, $M'_2$ and $M'_3$.

By reference to Figs. 1 and 3, it will be noted that the three magnetic core structures $M_1$, $M_2$ and $M_3$ are associated respectively with the three rectifier groups in which the circuits from each of the three pairs of secondary conductors, one pair on each of the three winding legs, are magnetically coupled, as shown in the circuits associated with the current dividers $M_1$, $M_2$ and $M_3$ in Fig. 3, and the pairs of Y-connected groups to be referred to later are magnetically coupled as shown by the circuits associated with the absorption chokes $M'_1$, $M'_2$ and $M'_3$ in Fig. 3.

Referring to Fig. 2, it will be noted that the core structure $M_1$ there shown is provided with two rows of three windows each, the lower row of windows 21, 22 and 23 accommodating, respectively, the conductors leading from the three pairs of windings on the three winding legs. The potential drops of the conductors through these current dividers or coupling transformers are very small and the conductors which influence each other and are drawn in opposite directions through their common window 21, 22 or 23 and are then connected to a star point or neutral conductor that is common to a winding from each of the three transformer legs. For example, the conductors from the pair of windings $1S_1$ and $1S'_2$, are coupled by being drawn in opposite directions through the window 21 shown in Fig. 2 and indicated as windings 24 and 25 in Fig. 3 to balance the current output from the pair of windings $1S_1$ and $1S'_1$ to the neutral or star conductors 26 and 27, respectively. The conductors 24 and 25 are shown in Figs. 1 and 2 as three parallel bars each. Similarly, the conductors from windings $1S_2$ and $1S'_2$ are coupled, as shown at 28 and 29 by being drawn in opposite directions through the window 22 in the core $M_1$ and leading, respectively, to star conductors 31 and 32. Also, likewise, the circuit conductors from the pair of windings $1S_3$ and $1S'_3$ are coupled as shown at 33 and 34 by being passed in opposite directions through the window 23 in the core $M_1$, in leading to their respective star connected conductors 35 and 36.

Each of the pairs of secondary windings of the remaining two groups are similarly connected through the appropriate windows of the core structures $M_2$ and $M_3$ to their appropriate star connected conductor. For example, as shown in Fig. 3, conductors $2S_1$ and $2S'_1$ are coupled at 37 and 38, the output currents from windings $2S_2$ and $2S'_2$ are coupled at 39 and 40 and the output currents from windings $2S_3$ and $2S'_3$ is coupled at 41 and 42. Similarly, the output currents from windings $3S_1$ and $3S'_1$ are coupled at 43 and 44, the output currents from windings $3S_2$ and $3S'_2$ are coupled at 45 and 46 and the output currents from windings $3S_3$ and $3S'_3$ are coupled at 47 and 48.

It will be noted that the star or neutral point conductor 26 serves as a neutral or star point for the three windings $1S_1$, on the core leg $K_1$ and associated with rectifier group I, the winding $2S_3$ on the core leg $K_3$, associated with the rectifier group II, and the secondary winding $3S_2$ on the core leg $K_2$ associated with the rectifier group III. The currents from these three windings combine and flow through a balancing reactor or energy absorbing choke coil, the coupling winding of which is shown as 51 in Fig. 3. The three windings corresponding to the three other windings of each pair, namely $1S'_1$, $2S'_3$ and $3S'_2$ are all connected together by the star connecting conductor 27 from which they lead through winding turn 52 that is coupled to the turn 51 of the energy absorbing choke $M'_1$ to the negative conductor 101.

Referring to Figs. 1 and 2, it will be observed that the coupling between the conductors indicated as windings 51 and 52 in Fig. 3 is effected through the three upper windows 53, 54 and 55 in the core structure $M_1$ in which each circuit is carried by three parallel connected conductors 51 and 52, respectively, that are drawn in opposite directions through the three windows to magnetically couple the output currents from the two star connected groups of secondary windings.

In a similar manner, the neutral point conductors 31 and 32 each form points of connection for three secondary windings, one associated with each transformer leg and with each of the three rectifier groups, and each of the three windings connected to conductor 31 being the associated one of three pairs, the other ones of which are connected to conductor 32. The combined output current from the two sets of star connected windings are coupled at 56 and 57 through the three upper windows of the core structure $M_2$ in a manner similar to that shown with respect to the core structure $M_1$ in Fig. 2. Likewise, the remaining sets of three pairs of secondary conductors are connected through the coupling windings 58 and 59 in the three upper windows of the core structure $M_3$.

It will be clear from the following description that each pair of secondary conductors are compensated by the coupling through the appropriate lower window in one of the current dividers or compensator core structures so as to prevent undue current unbalance between the windings of each pair. The magnetic fluxes thus created also maintain a balance between the group of six windings supplying one rectifier group. Also, the pairs of groups, each group consisting of Y-connected secondary windings, one associated with each rectifier group and wound on separate ones of the three core legs are compensated by means of the coupling effected by passing the conductors leading therefrom in opposite directions through the three upper windows in the core structures of the current dividers which act in this case also as energy absorbing chokes between the star points and the negative terminal 101. It will be appreciated that the several bus conductors in Fig. 1 marked 101 are all connected together electrically to form a single negative terminal.

If desired, fuses 61 may be provided between the current dividers and the star or neutral point conductors which will melt in case the unbalance between the windings becomes too great to be balanced approximately by the current dividers. Also, as shown in Fig. 4, windings 63, 64 and 65 may be provided in the three windows 21, 22 and 23 of each of the current divider core structures in which will be generated a voltage that is a measure of the differential currents in the associated pairs of windings 24—25, 28—29 and 33—34 to supply indicating devices 66, 67 and 68 to indicate an undue overbalance in the circuits.

The windings 63, 64 and 65 may, if desired, be connected through rectifier units 71, 72 and 73 to terminal conductors 74 and 75 connected to a winding 76 of a control circuit for tripping a circuit breaker 77 in the primary winding supply circuit of the transformer to interrupt the operation of the apparatus upon undue unbalance.

It will be apparent to those skilled in the art that modifications in the circuit and apparatus illustrated and described are possible within the spirit of my invention and I do not wish to be limited otherwise than by the scope of the appended claims.

I claim as my invention:

1. Power translating apparatus for supplying direct current energy from an alternating current source comprising a transformer having a plurality of winding legs energized from the separate phases of a polyphase primary source, a plurality of pairs of secondary windings on each winding leg, each secondary winding having one terminal connected through a rectifier unit individual thereto to a direct current output terminal conductor, the other terminal of each secondary winding being connected to the other direct current output terminal conductor through a circuit including a balancing reactor for magnetically coupling the circuits from each pair of secondary windings to compensate the current output therefrom for inequalities in internal resistances of the circuits.

2. Power translating apparatus for supplying direct current energy from an alternating current source comprising a transformer having a plurality of winding legs energized from the separate phases of a polyphase primary source, a plurality of pairs of secondary windings on each winding leg, each secondary winding having one terminal connected through a rectifier unit individual thereto to a direct current output terminal conductor, the other terminal of each secondary winding being connected to the other direct current output terminal conductor through a circuit including a neutral point conductor common to a secondary winding on each of the three winding legs and between which and the three windings balancing reactors are connected for magnetically coupling the circuits from the three star-connected windings and their associated pairs.

3. Power translating apparatus for supplying direct current energy from an alternating current source comprising a transformer having a plurality of winding legs energized from the separate phases of a polyphase primary source, a plurality of pairs of secondary windings on each winding leg, each secondary winding having one terminal connected through a rectifier unit individual thereto to a direct current output terminal conductor, the other terminal of each secondary winding being connected to the other direct current output terminal conductor through a circuit including a neutral point conductor common to a secondary winding on each of the three winding legs and between which and the three windings balancing reactors are connected for magnetically coupling the circuits between each of the three star-connected windings and its associated pair, and an additional balancing reactor having magnetically coupled windings connected between the star-connected points of associated pairs of secondary windings and the second named terminal conductor to compensate the current output from such star-connected windings.

4. Power translating apparatus for supplying direct current energy from an alternating current source comprising a transformer having a plurality of winding legs energized from the separate phases of a polyphase primary source, a plurality of pairs of secondary windings on each winding leg, each secondary winding having one terminal connected through a rectifier unit individual thereto to a direct current output terminal conductor, the other terminal of each secondary winding being connected to the other direct current output terminal conductor through a circuit including a balancing reactor for inductively relating the current flow from each pair of secondary windings to compensate the current output therefrom for inequalities in internal resistance in the associated rectifier circuits, said circuit including a conductor forming a star-connected point between the above named balancing reactor and the second named direct current output terminal common to a secondary winding on each of the three winding legs, and additional balancing reactors having magnetically coupled windings connected between the star-connected points and the second named terminal conductor to further compensate for inequalities in current output from pairs of the star-connected groups 5. Power translating apparatus for supplying direct current energy from an alternating current source comprising a transformer having three winding legs energized from the separate phases of a three-phase electric circuit, three pairs of secondary windings on each winding leg, each secondary winding having one terminal connected to a direct current output conductor through a rectifier unit individual thereto, the other terminals of said several secondary windings being connected to a second direct current terminal conductor through circuits for magnetically coupling the circuits of each pair of secondary windings and for magnetically coupling the circuits from the windings on the three winding legs of the transformer.

6. Power translating apparatus for supplying direct current energy from an alternating current source comprising a transformer having three winding legs energized from the separate phases of a three-phase electric circuit, three pairs of secondary windings on each winding leg, each secondary winding having one terminal connected to a direct current output conductor through a rectifier unit individual thereto, the other terminals of said several secondary windings being connected to a second direct current terminal conductor through circuits for magnetically coupling the circuits of each pair of secondary windings and for magnetically coupling the circuits from the windings on the three winding legs of the transformer, characterized in that the coupling reactor for a set of six secondary windings comprising three pairs on three winding legs consists of a single magnetic core containing a series of windows through which the coupled pairs of conductors pass.

7. Power translating apparatus for supplying direct current from an alternating current source comprising a transformer having three winding legs energized from the separate phases of a three-phase electric circuit, three pairs of secondary windings on each winding leg, each secondary winding having one terminal connected to a direct current output conductor through a rectifier unit individual thereto, the other terminals of said several secondary windings being connected to a second direct current terminal conductor through circuits for magnetically coupling the circuits of each pair of secondary windings and for magnetically coupling the secondary currents from three different parallel polyphase systems each including a winding on each of the three different winding legs.

8. Power translating apparatus for supplying direct current from an alternating current source comprising a transformer having three winding legs energized from the separate phases of a three-phase electric circuit, three pairs of secondary windings on each winding leg, each secondary winding having one terminal connected to a direct current output conductor through a rectifier unit individual thereto, the other terminals of said several secondary windings being connected to a second direct curernt terminal conductor through circuits for magnetically coupling the circuits of each pair of secondary windings and for magnetically coupling the secondary currents from three different parallel polyphase systems each including a winding on each of the three different winding legs, the magnetic coupling means including a magnetic core provided with a series of windows for accommodating the conductors from coupled pairs of secondary windings and a series of windows for accommodating the conductors from the coupled polyphase systems.

9. Power translating apparatus for supplying direct current energy from an alternating current source comprising a transformer having a plurality of winding legs energized from the separate phases of a polyphase primary source, a plurality of pairs of secondary windings on each winding leg, each secondary winding having one terminal connected through a rectifier unit individual thereto, to a direct current output terminal conductor, the other terminal of each secondary winding being connected to the other direct current output terminal conductor through a circuit including a balancing reactor for magnetically coupling the circuit from each pair of secondary windings to compensate the current output therefrom for inequalities in internal resistances of the circuits, and overcurrent fuses in circuit with the several secondary windings.

10. Power translating apparatus for supplying direct current energy from an alternating current source comprising a transformer having a plurality of winding legs energized from the separate phase of a polyphase primary source, a plurality of pairs of secondary windings on each winding leg, each secondary winding having one terminal connected through a rectifier unit individual thereto, to a direct current output terminal conductor, the other terminal of each secondary winding being connected to the other direct current output terminal conductor through a circuit including a balancing reactor for magnetically coupling the circuit from each pair of secondary windings to compensate the current output therefrom for inequalities in internal resistances of the circuits, and electro-responsive means actuated upon a large difference in the division of current between the coupled circuits.

OTTO WERNER.